March 31, 1936.  K. J. TOBIN  2,035,772
AUTOMOBILE SUSPENDING MEANS
Filed June 20, 1932   2 Sheets-Sheet 1

~INVENTOR~
KENNETH J. TOBIN
By~ Samuel Reese
ATTY

March 31, 1936. K. J. TOBIN 2,035,772
AUTOMOBILE SUSPENDING MEANS
Filed June 20, 1932 2 Sheets-Sheet 2
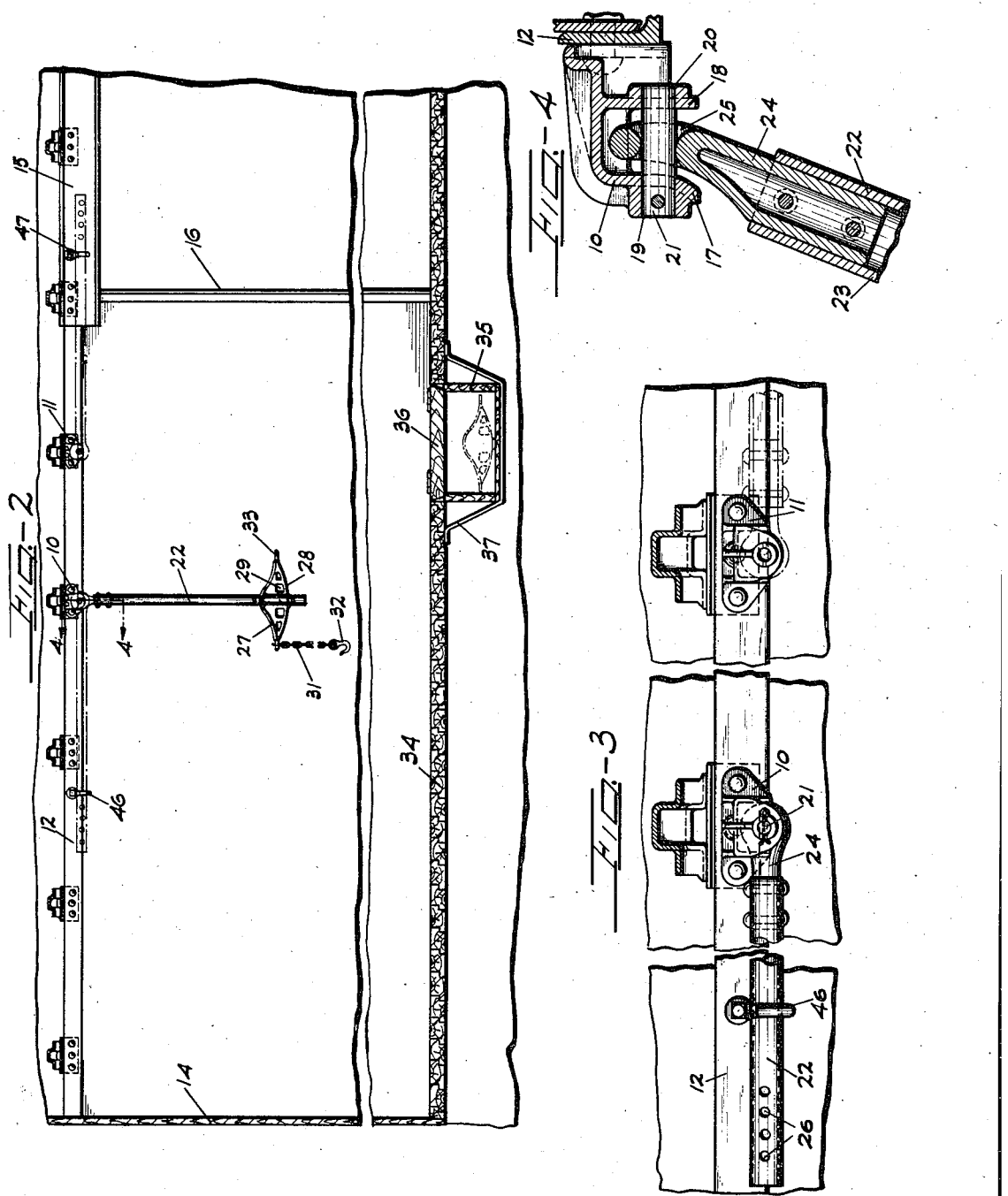
~INVENTOR~
KENNETH J. TOBIN
By~ Samuel Reese
ATTY.

Patented Mar. 31, 1936

2,035,772

UNITED STATES PATENT OFFICE 2,035,772

AUTOMOBILE SUSPENDING MEANS

Kenneth J. Tobin, Chicago, Ill., assignor, by mesne assignments, to Evans Products Company, Detroit, Mich., a corporation of Delaware Application June 20, 1932, Serial No. 618,231

2 Claims. (Cl. 105—368)

This invention relates to means for securing automobiles in railway house cars for shipment therein and concerns itself more particularly with such means capable of disposition in the cars so as not to vitiate the all-purpose utility thereof.

It is an object of this invention to provide means for suspending automobiles in inclined or half-decked position in freight cars for shipment therein.

A further object is to provide means for suspending automobiles in inclined position in house cars for shipment therein, said means being so carried by the cars when not in use that the cars may fall under the classification of general utility cars.

A further object is to provide all-purpose house cars designed to carry means for securing automobiles for shipment therein both in the operative and inoperative positions of said means.

A further object is to provide a novel method of storing means for securing automobiles in railway house cars for shipment therein.

Other objects will become apparent as the description of the invention proceeds.

In the drawings forming part of this specification

Figure 2 is a fragmentary longitudinal section through the house car prior to the loading of automobiles therein.

Figure 3 is a fragmentary enlarged elevation of supporting brackets and pipe of the suspending means.

Figure 4 is a vertical section taken on line 4—4 of Figure 2.

Figure 1:
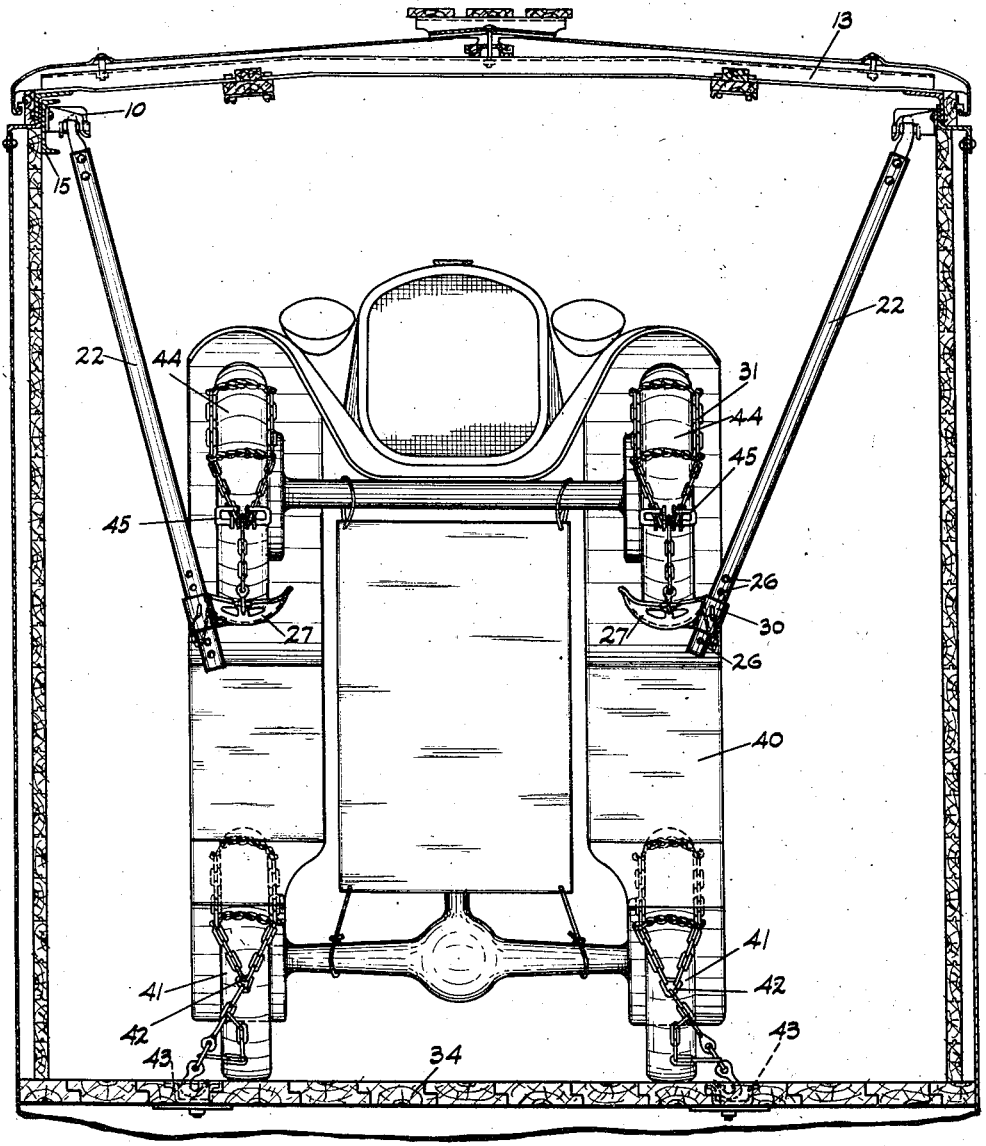
Figure 1 is a transverse section through a railway house car illustrating an automobile in half-decked position and the novel means of the invention for suspending one end of the automobile.

The existing means utilized for suspending or supporting automobiles in freight cars for transportation therein require, where such means is of a temporary nature, that they be removed from the freight car after shipment of automobiles therein in order that said car may subsequently be adapted for the transportation of other commodities. The removal of such impermanent suspending or supporting means results in mutilation of the railway car and in refurnishing said car with such means where further loading of automobiles therein is necessary. Where permanent equipment has been installed in the freight cars for suspending or supporting automobiles therein it has generally been of such character as to interfere with the all-purpose utility of the car and to substantially decrease the cubical contents thereof for the loading of other commodities. These various objections have been overcome by the suspending means of the instant invention.

In the embodiment of the invention disclosed a plurality of spaced brackets 10 and 11 are secured preferably to the side plate 12 of a railway car 13, which as illustrated is preferably of the form known as a house car. These brackets are secured preferably in pairs adjacent the opposite ends of the freight car. The positioning of said brackets and one end 14 of the car are clearly illustrated in Figure 2 of the drawings. As clearly shown in Figure 1 of the drawings, these brackets are positioned upon the side plates on both of the side walls of the car, while in Figure 2 of the drawings one pair of adjacent brackets 10 and 11 is illustrated. It is to be understood that another pair of such brackets is similarly positioned adjacent the opposite end of the car. The house car 13 is preferably reinforced by means of the channel member 15 over the door openings formed in the car, one of which is indicated at 16.

Each of the brackets secured to the side plates 12 is preferably in the form of a casting provided with spaced depending flanges 17—18. Aligned openings 19 and 20 are provided in said flanges and are adapted to receive a pin or shaft 21 extending transversely of the car and from which a bar 22 is adapted to be hung.

The bar 22 preferably takes the form of a pipe 23 to the upper end of which a plug 24 is secured. The free end of the plug is provided with an opening 25 through which the shaft or pin 21 is adapted to extend. The lower end of the pipe 23 is provided with a plurality of spaced openings 26. A wheel receiving member 27 is adjustably secured to the lower end of the pipe 23, adjustment being effected by means of the plurality of spaced openings 26 formed in the pipe.

The wheel receiving member 27 is clearly illustrated in Figures 1 and 2 of the drawings and comprises preferably an integral casting having a dish-shaped or trough portion 28 cut away as indicated at 29 to secure lightness, and a socket member 30 adapted to be slid on the lower end of the pipe and through which securing bolts are adapted to extend to fasten the wheel receiving member 27 upon the pipe. A wheel engaging chain 31 is carried by the dish-shaped portion 28, the free end of said chain being provided with a hook 32 adapted to be engaged in an opening 33 provided in the end of the portion 28 opposite to that to which the chain is secured.

Secured to the railway car 13 below the floor 34 thereof is a receptacle 35, said receptacle opening into the floor of the car and being closed by means of a cover 36 hinged to said floor so as to lie flush therewith in closing position. Any desired mode of attachment of said box to the car may be employed. In the construction illustrated in Figure 2 of the drawings strap members 37 are employed to support said receptacle.

For purposes of description of the instant invention a single automobile 40, arranged in inclined or half-decked position, is illustrated. It is to be understood, however, that customarily two additional automobiles arranged with their wheels upon the floor of the car and another half decked automobile will be shipped simultaneously with the half-decked automobile shown. The wheels of the automobiles which are shipped flat, as well as the wheels 41 of the half-decked automobile 40 that are supported upon the floor of the car, are secured against movement in the freight car 13 by means of hold-down devices 42 applied to each of said wheels. These hold-down devices, as illustrated in Figure 1 of the drawings, extend over the upper portion of the periphery of said wheels and on opposite sides thereof, and are secured to the floor of the car by engagement with anchoring devices 43 secured thereto. The front wheels 44 of the half-decked automobile 40 are seated within the trough portions 28 of the wheel receiving members 27 and are securely fastened therein in substantially fixed relationship by means of the chains 31. These chains include, as the chains 41 may, tensioning devices 45 in order to securely fasten the wheels 44 in the wheel receiving members 27. It will be apparent that the suspending means herein described maintains the front end of the automobile in elevated position relative to the floor of the car.

When it is desired to use the railway house car for shipment of commodities other than automobiles, in which the suspending means are not employed, provision is made for the storing or disposition of the suspending means to permit such shipment without diminishing the cubical contents of the freight car. As a consequence of this fact the classification of such car as an all-purpose car is not vitiated. To prepare the freight car for shipment of commodities other than automobiles the wheel receiving member 27 is removed from the lower end of the pipe and stored within the receptacle 35 as indicated in dot and dash lines in Figure 2 of the drawings. The pipe 23 is then swung longitudinally relative to the car upon the pin or shaft 21 and supported in a substantially horizontal plane by means of a hook 46 secured preferably to a side plate of the car. Similarly the hold-down devices 42, upon removal from the wheels 41 of the automobile 40, may be stored within the receptacle 35. In this manner the suspending means are carried with the car and available for use when desired.

Attention is invited to the fact that the arrangement of the brackets 10 and 11 in pairs is had for the purpose of permitting hanging of the bar 22 optionally from either of these brackets, depending upon the length from end to end of the automobile which is to be shipped in half-decked position. When the bar 22 is hung from the bracket 11, said bar in its inoperative position will be supported by the hook 47, as indicated in dot and dash lines in Figure 2 of the drawings. When the bar 22 is hung from the bracket 10 the hook 46 will support said bar as indicated in dot and dash lines in Figure 2 of the drawings.

To those skilled in the art numerous modifications and changes in the embodiment of the invention will be apparent. It is intended that all such changes and modifications are to be comprehended within this invention, which is to be limited only by the scope of the appended claims.

I claim:

1. In a railway house car provided with a side plate, means for suspending an end of an automobile comprising a bracket secured to said side plate, a transversely extending pin carried by said bracket, a tubular member having one end provided with an eye through which said pin is adapted to extend, and a trough shaped member having a socket through which the other end of said tubular member is adapted to extend and means extending through said socket and said tubular member to secure said trough shaped member to said tubular member.

2. In a railway house car having a side plate, a plurality of spaced brackets secured to said side plate, a bar adapted to be optionally hung from said brackets for longitudinal swinging movement, a wheel receiving member carried by said bar and a hook secured to said side plate adjacent each bracket for selectively supporting said bar when the latter is swung longitudinally into engagement therewith after removal of said wheel engaging member.

KENNETH J. TOBIN.